(12) United States Patent
Brady

(10) Patent No.: US 7,610,277 B2
(45) Date of Patent: Oct. 27, 2009

(54) METHOD AND SYSTEM FOR LAUNCHING A BROWSER

(75) Inventor: Colin Brady, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 314 days.

(21) Appl. No.: 11/693,448

(22) Filed: Mar. 29, 2007

(65) Prior Publication Data

US 2008/0243810 A1 Oct. 2, 2008

(51) Int. Cl.
G06F 17/30 (2006.01)
(52) U.S. Cl. .......................................... 707/3
(58) Field of Classification Search ................. 707/3, 707/10, 102; 709/217
See application file for complete search history.

(56) References Cited

U.S. PATENT DOCUMENTS

| | | | | |
|---|---|---|---|---|
| 6,564,254 | B1* | 5/2003 | Shoji et al. | 709/217 |
| 7,107,548 | B2 | 9/2006 | Shafron | |
| 2005/0050084 | A1* | 3/2005 | Atm | 707/102 |
| 2007/0066364 | A1* | 3/2007 | Gil et al. | 455/566 |
| 2007/0157118 | A1* | 7/2007 | Wuttke | 715/810 |

OTHER PUBLICATIONS

Windows Vista: Features Explained: Instant Search [online] Microsoft Corporation, © 2007. [retrieved on Jun. 13, 2007] Retrieved from the Internet: <http://www.microsoft.com/windows/products/windowsvista/features /details/instantsearch.mspx>.
Konfabulator—Gallery. [online] Yahoo! Inc. © 2002-2005. [retrieved on Jun. 13, 2007] Retrieved from the Internet: <http://widgetgallery.com/>.
Keystroke logging—Wikipedia, the free encyclopedia. [online] Wikimedia Foundation, Inc. Jun. 5, 2007. [retrieved on Jun. 13, 2007] [Retrieved from the Internet: <http://en.wikipedia.org/wiki/Keylogger>.
Download details: Microsoft Keyboard Layout Creator (MSKLC) Version 1.3.4073 [online] Microsoft Corporation, © 2007. [retrieved on Jun. 13, 2007] Retrieved from the Internet: <http://www.microsoft.com/downloads/details.aspx?familyid=FB7B3DCD-D4C1-4943-9C74-D8DF57EF19D7&displaylang=en>.

* cited by examiner

*Primary Examiner*—Etienne P LeRoux
(74) *Attorney, Agent, or Firm*—James J. DeCarlo; Greenberg Traurig, LLP

(57) ABSTRACT

Systems and methods are described for searching a publicly accessible network (e.g., the Internet) with an efficient use of space on a display device (e.g., a monitor, a screen) of a computer. Computers often use graphical interfaces for user interaction, and thus graphical space can be in short supply during some applications. In addition, requiring a user to navigate various graphical interfaces to access a searching utility can increase the effective time of the searching operation. Systems and methods are described for searching a network in an efficient and effective manner.

25 Claims, 2 Drawing Sheets

METHOD AND SYSTEM FOR LAUNCHING A BROWSER

BACKGROUND

Computers are increasingly controlled through graphical interfaces. For example, operating systems such as Windows® sold by Microsoft Corporation use graphical interfaces to control various programs run by a computer. Screen space can become crowded by various programs and control interfaces. A user may be impeded in performing a particular task because of the number of programs and control interfaces crowding the user's screen. For example, in order to open one control interface, another control interface may need to be closed, thereby complicating the process of starting the first control interface.

SUMMARY

Systems and methods are described for searching a publicly accessible network (e.g., the Internet) with an efficient use of space on a display device (e.g., a monitor, a screen) of a computer. Computers often use graphical interfaces for user interaction, and thus graphical space can be in short supply during the use of some applications. In addition, requiring a user to navigate various graphical interfaces to access a searching utility can increase the effective time of the searching operation. Systems and methods are described for searching a network in an efficient and effective manner.

In one aspect, the disclosure describes a method including receiving a first keyboard message, interpreting the first keyboard message as a request to perform a search on a publicly accessible network, and displaying an interim graphical user interface in response to the request to perform the search, wherein the interim graphical user interface has a text string entry field. The method further includes, while displaying the interim graphical user interface, receiving a text string, in response to receiving the text string, constructing a search string based on the text string, and in response to receiving the text string, issuing a launch command to activate a browser program, wherein the launch command has the search string embedded in the launch command.

In another aspect, the disclosure describes a system including a monitoring software routine that monitors keyboard messages, and an interface software routine that displays an interim graphical user interface, wherein the monitoring software routine activates the interface software routine upon detection of a first keyboard message by the monitoring software routine, and wherein the interface software routine receives a text string relating to a requested search. The system further includes a launching software routine that constructs a search string from the text string and launches a browser program using a launch command, wherein the launch command contains the search string, and wherein the browser program is different from the monitoring software routine, the interface software routine and the launching software routine.

The following description of various embodiments is merely exemplary in nature and is in no way intended to limit the invention, its application, or uses.

A BRIEF DESCRIPTION OF THE DRAWINGS

DETAILED DESCRIPTION

The following description of various embodiments is merely exemplary in nature and is in no way intended to limit the invention, its application, or uses. While various embodiments have been described for purposes of this specification, various changes and modifications may be made which will readily suggest themselves to those skilled in the art and which are encompassed in the spirit of the invention both disclosed herein and as defined in the appended claims.

Figure 1:
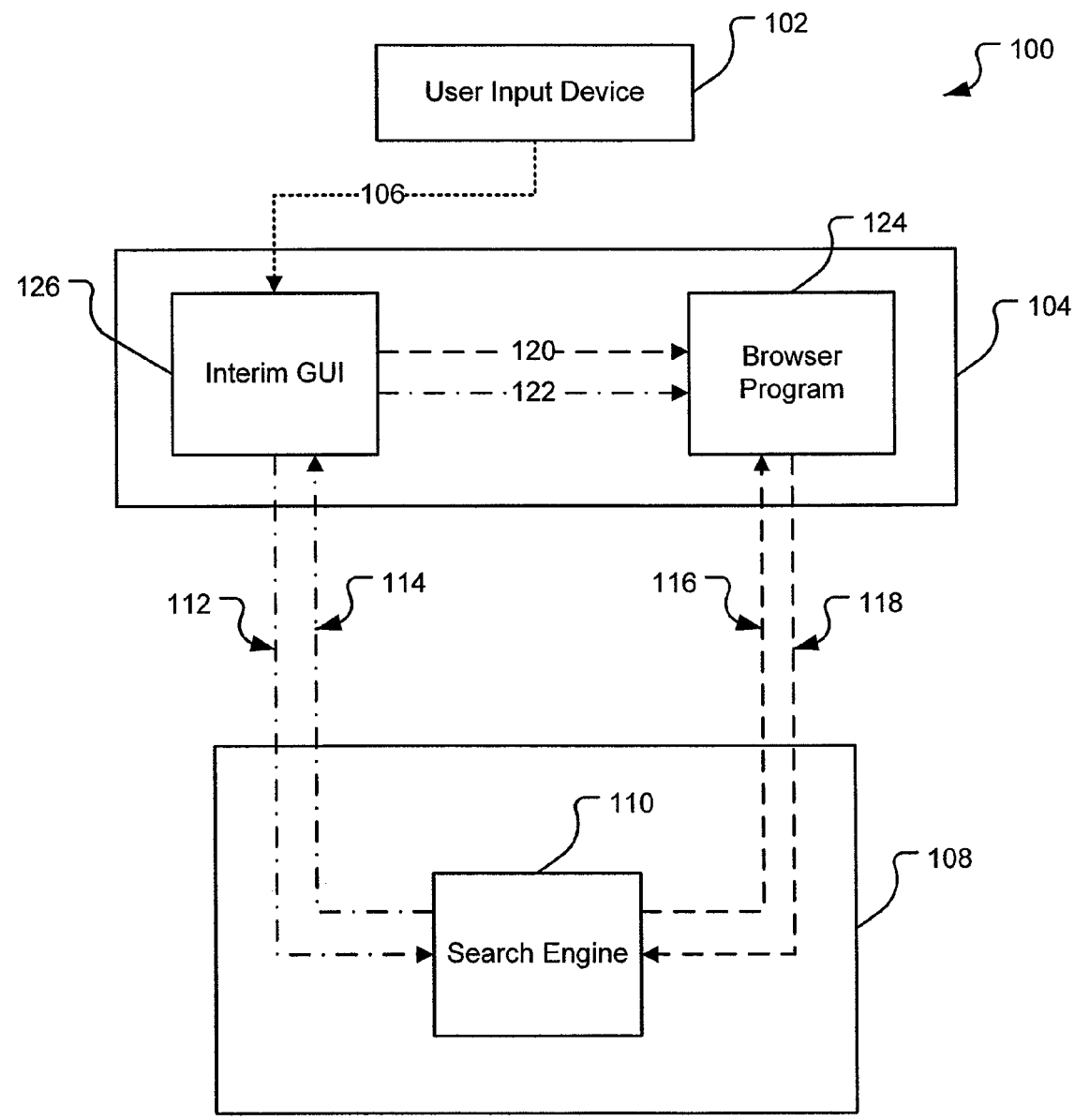
FIG. 1 shows an embodiment of a system for searching a publicly accessible network.

FIG. 1 shows an embodiment of a system 100 for searching a publicly accessible network. The system 100 includes a computing device 104 which represents a local machine to a user and a remote computing device 108 which represents generally a remote computing device in communication with the local computing device 104 over the publicly accessible network.

In one embodiment, a publicly accessible network is the Internet. In other embodiments, networks with varying degrees of public access may be considered publicly accessible networks. For example, a free wireless network may be considered a publicly accessible network. In addition, in some instances, an intranet may be considered a publicly accessible network.

As shown in FIG. 1, computing device 104 and computing device 108 are separate computing devices. For example, computing device 104 may be a personal computer and computing device 108 may be a business, industrial or mainframe computer. Computing device 108 may be a distributed computing device as known to those with skill in the art. As represented in FIG. 1, computing device 108 is designated a single computing device only for the expediency of showing that search engine 110 is located on a separate computing device 108 from computing device 104. Those skilled in the art will understand that a search engine may actually be implemented in several computing devices and/or distributed over a broad range of physical machines. Computing device 104 may also be physically implemented as several computing devices.

Computing device 104 is shown in the embodiment of FIG. 1 as a single computing device running both an interim graphical user interface (GUI) 126 and a browser program 124. Computing device 104 has a user input device 102 which represents user input devices such as a keyboard, a mouse, a touch pad or other means for user input of data. As shown in FIG. 1, user input device 102 connects to the interim GUI through dotted line 106 indicating that the user input device is capable of launching the interim GUI 126. This launching process will be discussed in greater detail below. The interim GUI 126 and the browser program 124 are different software routines or programs with different functions inside the computing device 104.

In one embodiment, the interim GUI 126 is launched initially from the user input device 102 through a keyboard message or other signal. The interim GUI 126 may receive a text string from the user input device, construct a search string from the text string, and launch the browser program 124. Unlike the browser program 124, the interim GUI does not show search results and, is not a general purpose program. For example, the interim GUI allows a search to be performed whereas the browser program 124 allows navigation and access to content on the publicly accessible network. Specifically, a browser program may allow a user to read a web page on the Internet, download information from the Internet, and view a video clip stored on the Internet.

By contrast, the interim GUI 126 only allows the parameters of the search (e.g., instructions from a user) to be entered and only performs the function of assisting and processing that search, for example, through the launching of the browser program 124. These parameters may include, for example, a text string for a search and a type of file to be targeted by the search. The parameters may be entered through any appropriate means. For example, a text string may be entered through a text entry field of the interim GUI 126, and a type of file may be selected through an input element such as a radio button. As another example, both a text string for a search and a type of file may be entered by keystrokes from a keyboard.

In an alternative embodiment, computing device 104 and computing device 108 may be interconnected or may otherwise be parts of the same computing device. For example, a single computing device (not shown) may operate the interim GUI 126, the browser program 124, and the search engine 110, and the search engine may search for files stored in that single computing device (e.g., a desktop search) based on a text string received, as described further herein, by the interim GUI 126 and passed, as described further herein, to the browser program 124 (e.g., through launching the browser program containing a search string).

In FIG. 1, signals between interim GUI 126, browser program 124, and search engine 110 are noted for purposes of illustrating embodiments of interactions between those elements. The dash-plus-dots set of signals, e.g., 112, 114, and 122, illustrate one embodiment of interactions between the elements, while the dashed set of signals, e.g., signals 120, 118, and 116, illustrate another embodiment. These embodiments will be discussed in further detail below.

As described above, a search engine 110 is located on a remote computing device 108 and it receives search requests (e.g., comprising search strings) from various entities. The interim GUI 126 may send a search string directly to the search engine as indicated with the signal 112. The search engine may then respond with search results as indicated by signal 114. In this embodiment, the interim GUI may then launch the browser program with the search string in some or all of the search results as indicated by signal 122.

The search results may be ranked or rated, such that there is a first rated search result which has the highest ranking. Types of rankings or ratings of search results are known to those with skill in the art and may contain different categories (e.g., sponsored sites, popular sites, recently updated sites).

In another embodiment, the interim GUI 126 may launch the browser program 124 as indicated by signal 120 with a search string that the interim GUI has constructed from a text string received from the user input device. Thus, as indicated by signal 120, the interim GUI may launch the browser program before a search has been performed. The browser program may then launch and send the search string to the search engine as indicated by signal 118. In this embodiment, the search engine responds to the search request with search results sent to the browser program as indicated by signal 116.

Elements of the systems described herein may be implemented in hardware, software routines, firmware, any combination thereof, or in another appropriate medium. The systems described herein may implement methods described herein. In addition, the methods described herein may form systems described herein when implemented in hardware, software, firmware, any combination thereof, or in another appropriate medium. Therefore, the descriptions of the methods and systems herein supplement each other and should be understood by those with skill in the art forming a cumulative disclosure.

The methods described herein may be performed by any part of a system described herein. In addition, the methods described herein may be performed iteratively, repeatedly, and/or in parts. Some of the methods or parts of the methods described herein may be performed simultaneously. In addition, elements of the systems described herein may be distributed geographically or functionally in any configuration.

Figure 2:
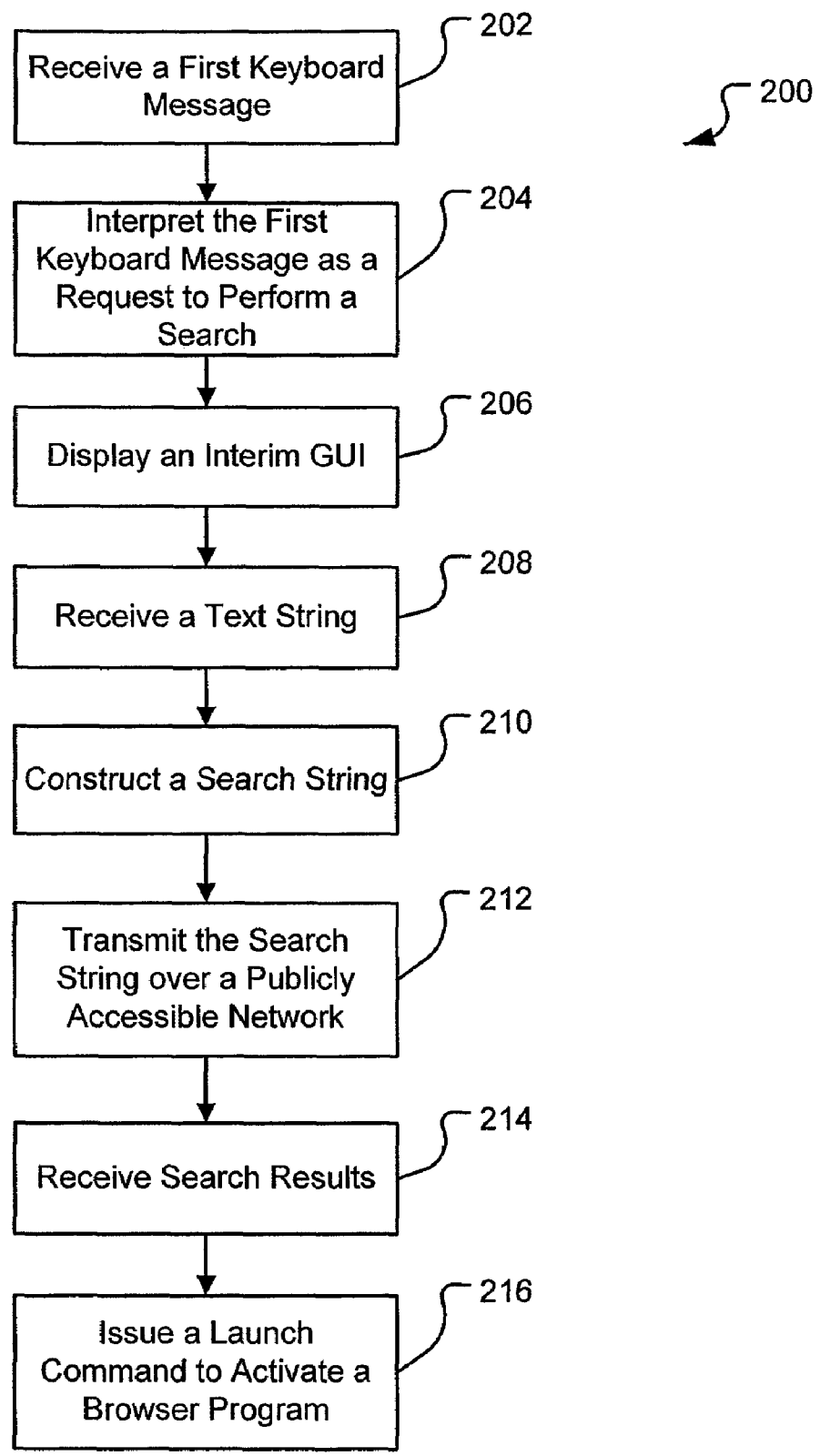
FIG. 2 shows a flowchart of an embodiment of a method for launching the browser.

FIG. 2 shows a flowchart of an embodiment of a method 200 for launching the browser. In the embodiment shown, a first keyboard message is received 202. This keyboard message may be received 202 in many manners, including through intercepting low level keyboard messages or through remapping registry entries. As known by those with skill in the art, there are several methods for intercepting, interpreting and receiving keyboard messages. Any of these techniques may be used in order to facilitate receiving a first keyboard message 202.

After a first keyboard message is received 202, the first keyboard message is interpreted 204 as a request to perform a search. Those with skill in the art will understand there are several ways to interpret the first keyboard message.

In one embodiment, as described above, a computer registry may be remapped in order to aid in interpreting the first keyboard message. In another embodiment, a monitoring software routine may be run in order to interpret the first keyboard message as a request to perform a search. In another embodiment, the monitoring software routine may be integrated into another software routine which launches an interim GUI after the request is interpreted 204.

After the first keyboard message is interpreted as a request to perform a search 204, the embodiment 200 shown in FIG. 2 displays an interim GUI 206. The interim GUI can assist in performing a search by receiving a text string from a user through a user input device. The characteristics of an interim GUI itself are described further herein.

In one embodiment, when the interim GUI is displayed 206, any further input from a keyboard or other user input device is directed to a text entry field on the interim GUI. For example, any text entries from a user input device which follow the display of the interim GUI will be entered into the interim GUI's text entry field. Those skilled in the art will understand that there are several ways of implementing such direction of text to a particular text field. In addition, those skilled in the art will understand that such a direction of text into a particular text entry field may be easily changed through a user input device such as a keyboard (e.g., through a tab key) or through another user input device such as a mouse (e.g., through push button selection) such that text is entered into a different text field or a different program.

In another embodiment, the text entries from a user are not automatically directed to the interim GUI. For example, a user may need to actively select the text entry field of the interim GUI in order to direct the user's text entries to the interim GUI.

The description above of directing the text from user input device into the interim GUI's text entry field is not meant as a limitation that the text entry from a user input device be permanently directed through the text entry of the interim GUI. Rather, text entry from the user input device such as a keyboard may be temporarily directed to the text entry field for the interim GUI with such direction able to be changed at the will of a user through further selection by the user of another GUI element.

In the embodiment of the method shown, a text string is received 208 in the text entry field of the interim GUI. In one embodiment, the text string may be received 208 and processed as it is typed by a user. In another embodiment, the text string may be received 208 and processed after the user has indicated the text string is complete, for example, by signaling through a conventional method that the text string is complete (e.g., a carriage return, the enter key, selection of a radio button).

In the embodiment shown in FIG. 2, after a text string is received 208, a search string is constructed 210. Because a search string may contain instructions for a search engine, including the text string, there are many types of search strings. The search string constructed 210 may include any type of search string now known or any type later developed. In one embodiment, constructing a search string 210 is performed to produce a search string which is specially adapted for a particular search engine. In another embodiment, a search string may be constructed 204 to a generic standard.

In one embodiment, constructing a search string may include information about the type of search to be performed on the text string. For example, a search may be for a particular type of file on a publicly accessible network, such as an image file, a video file, a scholarly journal article, a text file, a presentation file of a particular format, or another type of file. The type of file searched for may be based on the content or subject matter of the file (e.g., news, sports, entertainment), for example, through use of descriptors, meta-data, tags or metatags, or other data related with a file or its contents. For example, a type of file may include a descriptor of the content of the file. In some embodiments, selecting a type of file which includes a descriptor of the content of the file will affect the construction of the search string 210, including through the addition of the descriptor in the search string. The search string constructed 210 may include information about this type of file to guide a search engine to search files containing at least part of the text string which also match the type or types of files selected.

In the embodiment shown, after the search string is constructed 210, the search string is transmitted 212 over a publicly accessible network. The transmitting of the search string 212 over a publicly accessible network may be directed toward a search engine address (e.g., a network address which accesses a search engine) capable of receiving the search string. In one embodiment, a search engine address may include a search string or an encoded version of the search string, and accessing the search engine from that address invokes a search by the search engine of that search string.

It should be noted, as described above and as further described herein, that a search string may be transmitted 212 by the same software routine or program which is displaying the interim GUI or may be transmitted 212 by another software routine, such as a browser program.

The order described in FIG. 2 of transmitting the search string over the publicly accessible network before a browser program is launched describes just one embodiment.

In another embodiment (not shown), transmitting the search string 212 over a publicly accessible network and receiving search results 214 may be performed after issuing a launch command 216 to activate a browser program. In this embodiment, the received search results are not received by the interim GUI and, instead, the interim GUI issues a launch command 216 based only on instructions received from a user. In one embodiment the instructions received from the user are the text string received 208. In another embodiment, the instructions received from the user are the text string received 208 and a file type selection received from the user.

Upon receiving search results 214, as a response to the transmitted search string, those search results in the initial search string may be included in a launch command used to activate a browser program. In the embodiment shown, after receiving search results 214, a launch command is issued 216 to activate a browser program. A browser program may be launched with an initial site to browse the search engine. In another embodiment, the browser program may be launched 216 with part of the search results received 214.

The preceding description of various embodiments is merely exemplary in nature and is in no way intended to limit the invention, its application, or uses.

The invention claimed is:

1. A method for launching a browser program on a computing device, the method comprising:
   receiving a first keyboard message over a publicly accessible network;
   interpreting the first keyboard message as a request to perform a search on the network;
   visibly displaying an interim graphical user interface on a display of the computing device in response to the request to perform the search, wherein the interim graphical user interface has a text string entry field;
   while displaying the interim graphical user interface, receiving a text string via the text string entry field over the network, said text string comprises text and a type of file to be targeted;
   in response to receiving the text string, constructing a search string based on the text string; and
   in response to receiving the text string, issuing a launch command to activate a browser program, wherein the launch command contains the search string.

2. The method of claim 1, wherein the launch command contains a search engine address.

3. The method of claim 1, wherein the search engine address contains the search string.

4. The method of claim 1, wherein the method further comprises:
   before issuing the launch command, transmitting the search string over the publicly accessible network to a search engine operated on a remote computer.

5. The method of claim 4, wherein the method further comprises:
   receiving search results from the search engine utility; and
   after receiving the search results, issuing the launch command.

6. The method of claim 5, wherein the launch command includes at least part of the search results.

7. The method of claim 5, further comprising:
   issuing a navigation command to the browser program, wherein the navigation command includes a search result address, wherein the search result address is contained in the search results.

8. The method of claim 7, wherein the search result address is a first rated search result among the search results.

9. The method of claim 1, further comprising:
   receiving an execution command via the interim graphical user interface to perform a search with the text string;
   wherein the constructing the search string is performed in response to receiving the execution command; and
   in response to receiving the execution command, stopping the displaying of the interim graphical user interface.

10. The method of claim 1, wherein the interim graphical user interface includes a plurality of input elements each of which is associated with types of files targeted by the search, the method further comprising:
    receiving a selection of one of the plurality of input elements; and
    constructing the search string to include the type of file associated with the selected input element.

11. The method of claim 1, further comprising:
    receiving a second keyboard message; and interpreting the second keyboard message as a selection of a targeted type of file to be targeted by the search.

12. The method of claim 1, wherein the first keyboard message is a low-level keyboard message; and
wherein receiving the first keyboard message is performed via intercepting the low-level keyboard message.

13. The method of claim 1, wherein interpreting is performed via remapping a registry entry.

14. A computer-operated searching system, the system comprising:
a monitoring software routine stored on a computer-readable storage medium that monitors keyboard messages;
an interface software routine stored on the computer-readable storage medium that visibly displays an interim graphical user interface on a display of a computing device, wherein the monitoring software routine activates the interface software routine upon detection of a first keyboard message by the monitoring software routine;
wherein the interface software routine receives a text string relating to a requested search, said text string comprises text and a type of file to be targeted;
a launching software routine that constructs a search string from the text string and launches a browser program using a launch command;
wherein the launch command contains the search string; and
wherein the browser program is different from the monitoring software routine, the interface software routine and the launching software routine.

15. The system of claim 14, wherein the launch command contains a search engine address.

16. The system of claim 15, wherein the search engine address contains the search string.

17. The system of claim 14, wherein the launching software routine transmits the search string to a search engine and receives search results from the search engine; and
wherein the launching software routine further constructs the search string from the search results.

18. The system of claim 17, wherein the launching software routine issues a navigation command to the browser program, wherein the navigation command includes a search result address, wherein the search result address is contained in the search results.

19. The method of claim 18, wherein the search result address is a first rated search result among the search results.

20. The system of claim 14, wherein the interface software routine removes the interim graphical user interface after the launching software routine launches the browser program.

21. The system of claim 14, wherein the interim graphical user interface includes a plurality of input elements each of which is associated with types of files targeted by the search;
wherein the interface software routine receives a selection of one of the plurality of input elements; and
wherein the launching software routine constructs the search string to include the type of file associated with the selected input element.

22. A method comprising:
receiving a request to perform a search on a local computer;
visibly displaying an interim graphical user interface on a display of a computing device in response to the request to perform the search, wherein the interim graphical user interface has a text string entry field;
while displaying the interim graphical user interface, receiving a text string comprising text and a type of file to be targeted via the text string entry field;
in response to receiving the text string, constructing a search string based on the text string, wherein the search string is adapted for searching the local computer; and
in response to receiving the text string, issuing a launch command to activate a browser program, wherein the launch command contains the search string.

23. The method of claim 22, wherein the launch command contains the search string.

24. The method of claim 22, wherein the interim graphical user interface includes a plurality of input elements each of which is associated with types of files targeted by the search, the method further comprising:
receiving a selection of one of the plurality of input elements; and
constructing the search string to include the type of file associated with the selected input element.

25. The method of claim 22, further comprising:
receiving a keyboard message; and
interpreting the keyboard message as a selection of a targeted type of file to be targeted by the search.

* * * * *